(12) United States Patent
Abrahamson

(10) Patent No.: US 9,666,868 B2
(45) Date of Patent: May 30, 2017

(54) LEAD-ACID BATTERY CONSTRUCTION

(75) Inventor: John Abrahamson, Christchurch (NZ)

(73) Assignee: ArcActive Limited, Christchurch (NZ)

( * ) Notice: Subject to any disclaimer, the term of this patent is extended or adjusted under 35 U.S.C. 154(b) by 1098 days.

(21) Appl. No.: 13/518,556

(22) PCT Filed: Dec. 23, 2010

(86) PCT No.: PCT/NZ2010/000264
§ 371 (c)(1),
(2), (4) Date: Sep. 18, 2012

(87) PCT Pub. No.: WO2011/078707
PCT Pub. Date: Jun. 30, 2011

(65) Prior Publication Data
US 2013/0004842 A1  Jan. 3, 2013

(30) Foreign Application Priority Data

Dec. 24, 2009 (NZ) ........................................ 582397

(51) Int. Cl.
| | |
|---|---|
| *H01M 4/20* | (2006.01) |
| *H01M 4/68* | (2006.01) |
| *H01M 4/04* | (2006.01) |
| *H01M 4/66* | (2006.01) |
| *H01M 4/80* | (2006.01) |
| *H01M 4/82* | (2006.01) |

(52) U.S. Cl.
CPC ........... *H01M 4/68* (2013.01); *H01M 4/0404* (2013.01); *H01M 4/20* (2013.01); *H01M 4/663* (2013.01); *H01M 4/80* (2013.01); *H01M 4/82* (2013.01); *Y02P 70/54* (2015.11); *Y10T 29/49115* (2015.01)

(58) Field of Classification Search
None
See application file for complete search history.

(56) References Cited

U.S. PATENT DOCUMENTS

| | | | |
|---|---|---|---|
| 4,429,442 | A | 2/1984 | Thomas |
| 5,156,935 | A | 10/1992 | Hohjo et al. |
| 6,372,192 | B1 | 4/2002 | Paulauskas et al. |
| 2005/0208382 | A1 | 9/2005 | Datta et al. |
| 2009/0269666 | A1 | 10/2009 | Lara-Curzio et al. |

FOREIGN PATENT DOCUMENTS

| | | |
|---|---|---|
| JP | 03285263 | 12/1991 |
| WO | 2006105186 | 10/2006 |

*Primary Examiner* — Tracy Dove
(74) *Attorney, Agent, or Firm* — Dann, Dorfman, Herrell and Skillman, P.C.

(57) ABSTRACT

A lead-acid battery or cell comprises electrode(s) of with current collector(s) of a fibrous material with an average interfiber spacing of less than 50 microns. The current collector material may be a carbon fiber material which has been thermally treated by electric arc discharge. The fibrous current collector material may comprise an impregnated paste comprising a mixture of lead sulphate particles and dilute sulfuric acid.

25 Claims, 6 Drawing Sheets ic application of the fibrous material.

LEAD-ACID BATTERY CONSTRUCTION

FIELD OF THE INVENTION

The invention relates to an improved battery construction for lead-acid batteries.

BACKGROUND

A battery stores and releases energy by electrochemical reaction(s) at the surfaces of its electrodes. Each cell of a lead-acid battery in the fully charged state contains electrodes of elemental lead (Pb) and lead (IV) dioxide ($PbO_2$) in an electrolyte of dilute sulfuric acid ($H_2SO_4$). In the discharged state both electrodes turn into lead(II) sulfate ($PbSO_4$) and the electrolyte loses its dissolved sulfuric acid and becomes primarily water. In the pasted-plate construction each plate consists of a lead grid initially filled with a paste comprising a mixture of leady oxide (Pb and PbO) and dilute sulfuric acid. This construction allows the acid in the paste to react with the leady oxide inside the plate during cell formation (first charge and discharge cycle during which linkages between neighbouring particles, increasing the electrical conductivity and active surface area and thus the battery capacity. The paste may also contain carbon black, blanc fixe (fine barium sulfate), and lignosulfonate. The blanc fixe acts as a seed crystal for the lead to lead sulfate reaction. The lignosulfonate prevents the negative plate from forming a solid mass of lead sulfate during discharge. Carbon black counteracts the effect of inhibiting formation caused by the lignosulfonates.

SUMMARY OF INVENTION

In broad terms in one aspect the invention comprises a lead-acid battery or cell including at least one electrode comprising as a current collector a conductive fibrous material comprising:
filaments comprising fibres with an average interfibre spacing between fibres of less than 50 microns, and/or
filaments which are monofibres and in which the average interfibre spacing between monofibres is less than 50 microns.

In broad terms in another aspect the invention comprises a method for manufacturing a lead-acid battery or cell which includes forming at least one electrode comprising as current collector a conductive fibrous material comprising:
filaments comprising fibres with an average interfibre spacing between fibres of less than 50 microns, and/or
filaments which are monofibres and in which the average interfibre spacing between monofibres is less than 50 microns.

In broad terms the another aspect the invention comprises a lead-acid battery or cell comprising as a current collector a conductive fibrous material having length and width dimensions in a major plane of the material and depth perpendicular to said major plane of the material and comprising:
filaments comprising fibres with an average interfibre spacing between fibres of less than 50 microns, and/or
filaments which are monofibres and in which the average interfibre spacing between monofibres is less than 50 microns.

In some embodiments the average interfibre spacing is less than 20 microns.

Preferably said average interfibre spacing is over at least a major fraction of the material and more preferably over substantially all of the material.

The current collector fibrous material may have an average depth of the material of at least 0.2 mm or at least 1 mm.

The current collector may comprise multiple layers of the conductive fibrous material.

Preferably the current collector material has bulk resistivity less than 10 $\Omega$mm and preferably less than 1 $\Omega$mm or 0.1 $\Omega$mm.

The electrode material may be a woven material (comprising intersecting warp and weft fibres), a knitted material, or a non-woven material, such as a woven or knitted or non-woven fabric.

The positive electrode or electrodes, the negative electrode or electrodes, or both, may be formed of one or more layers of the conductive fibrous material.

Preferably the conductive fibrous material is also lighter than lead.

The current collector material may comprise a carbon fibre material such as a woven or knitted or non-woven carbon fibre fabric.

Carbon fibre current collector material may be heat treated to sufficient temperature to increase its electrical conductivity.

In broad terms in another aspect the invention comprises a lead-acid battery or cell including at least one electrode comprising as a current collector a carbon fibre material thermally treated to reduce the resistivity thereof. The thermal treatment may be by electric arc discharge.

In the microscale electrode construction of the invention the average interfibre distance between fibres of the conductive fibrous current collector material is less than 50 microns and may be less than 20 microns, either between individual fibres of multifibre filaments such as carbon multifilament yarn used for example to weave or knit the material, or between monofilaments of a material for example woven or knitted from a monofilament. During formation and subsequent discharge and re-charge cycling of a battery or cell, each particle must connect electrically directly or indirectly with neighbouring particles and to the electrode current collector before it can receive charge or deliver charge by reaction. In the microscale electrode construction of the invention relatively fewer particles must link to connect to near current collector fibres. For example the farthest distance of any active particle in a conducting chain of particles to the nearest current collector fibre surface may be less than 25 microns or less than 10 microns. This may increase utilisation and capacity, and also reduce the time required for initial cell formation, and reduce the chance of electrical isolation of active particles (particles can be isolated by adjacent particles converting to $PbSO_4$ before they do—$PbSO_4$ is electrically insulating).

During cell or battery construction the current collector material such as carbon fibre material may be impregnated under pressure with a paste, such as a paste comprising a mixture of lead sulphate particles and dilute sulfuric acid.

In broad terms in another aspect the invention comprises a method for manufacturing a battery or cell comprising applying to at least one electrode comprising as current collector a conductive fibrous material, a paste which comprises a mixture of lead sulphate particles and dilute sulfuric acid. In preferred embodiments lead sulphate paste is substantially the sole source of lead in the active material paste.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

The invention is further described with reference to the accompanying Figures by way of example wherein.

DETAILED DESCRIPTION OF PREFERRED EMBODIMENTS

Figure 1:
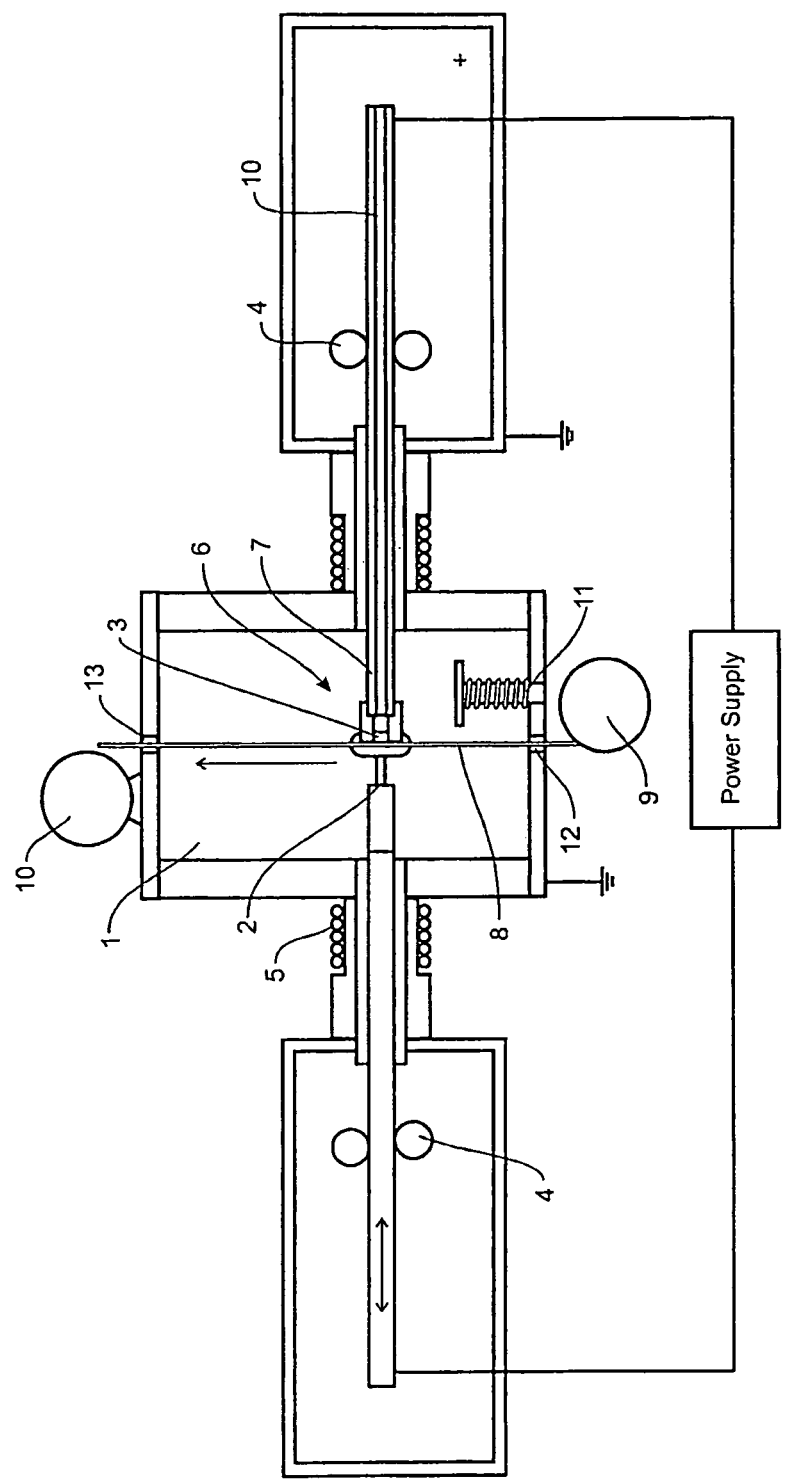
FIG. 1 schematically illustrates one form of reactor for the continuous or semi-continuous activation of a carbon fibre material for use as a current collector material according to the invention.

The invention includes a lead-acid battery including at least one electrode comprising as a current collector a microscale conductive fibrous material in which the average interfibre spacing thereof is less than 50 microns or less than 20 microns.

The current collector material may be a woven material, a knitted material, or a non-woven material, such as a woven or knitted or non-woven fabric. The material may comprise filaments extending unidirectionally in a major plane of the material with each filament composed of multiple fibres, with optionally connecting threads extending transversely across the filaments to mechanically connect the filaments.

The negative electrode or electrodes, the positive electrode or electrodes, or both, of a cell or battery may be formed with one or two or more layers of the conductive fibrous material as the current collector(s) of each electrode.

In preferred embodiments the electrode fibres are inherently conductive without requiring coating with a more conductive material such as a metal to increase conductivity, and may be carbon fibres which may in some embodiments be treated to increase conductivity, but in other embodiments the electrode fibres may be a less conductive microscale material the fibres of which are coated with a conductive or more conductive coating. In some embodiments the fibres of the current collector material may be coated with Pb or a Pb-based material. For example the negative electrode or electrodes may be coated with Pb and the positive electrode(s) coated with Pb and then thereon $PbO_2$.

Carbon fibre material for use as the electrode current collector material may be thermally treated at an elevated temperature sufficient to increase electrical conductivity. Thermal treatment may also increase the thermal conductivity of the material, which should be sufficient to prevent local hot spots on the electrode in use. Carbon fibres are generally hydrocarbon-based and during manufacture heated to around 1100° C. or more ("carbonised"). For use as current collector material in batteries or cells of the invention, carbon fibre material may be heated further, generally in the range 2200 to 2800° C., to enlarge regions in the carbon that are already aromatic or graphitic, increasing electrical conductivity, by evaporating off at least some or a major fraction of non-graphitic carbon, from the carbon fibres, and no more than a minor fraction of graphitic carbon. Thermal treatment to increase electrical and/or thermal conductivity may be by electric arc discharge, or in a resistively heated furnace for example.

The microscale current collector material may be treated to increase its surface area to increase capacitance. In some embodiments carbon fibre electrode material is activated to increase the surface area of the material to increase internal capacitance with the battery. The material may be heated to a surface temperature for example above about 3600K. Also applying and then drying an $Ni(NO_3)_2$ solution onto carbon fibre material before arc treatment may increase surface area development (apparently through oxidation). The material may be thermally treated by electric arc discharge. Alternatively the material may be activated by physical activation such as by steam or carbon dioxide at temperatures around 1000° C., or by chemical activation by for example alkali solutions. Activation typically creates pores of nanoscale and most typically up to 50 nm in diameter, in the material, or on the surface of the material. Materials with extensive pores smaller than around 1 nm may not good electronic conductors. Pores from 1 nm to around 10 nm may provide the surface area required for significant capacity, but pores well distributed above 10 nm are also needed to provide easy diffusional access of ions for adequate electrolyte conductivity. Also required is sufficient electrical conductivity within the solid.

In some embodiments carbon fibre material has carbon nanotubes (CNTs) attached thereto. The CNTs bearing material may be produced by electric arc discharge treatment of the carbon fibre material, or alternatively by chemical vapour deposition at lower temperatures in the presence of a catalyst.

Preferably the current collector material and the fibres thereof are flexible, which will assist in accommodating volume changes of the active material attached to the current collector material during battery cycling, and the microscale fibres may also reinforce the active material, both assisting to reduce breaking off ("shedding") of active material from the electrode in use.

The current collector material may be supported mechanically and a supporting mechanical frame may also provide electrical connection of each electrode or plate to the battery terminals. For example one or more square or rectangular adjacent layers of the current collector material may be supported to form a planar battery plate by a peripheral metal frame on all sides or between opposite metal frame elements on two opposite sides. Alternatively for example concentric cylindrical positive and negative plates of each cell may comprise cylindrical sections of the microscale current collector supported at either cylindrical end by circular metal frames.

Preferably substantially all or at least a majority of filaments/fibres of the electrode material extend continuously across the electrode between or to a metal frame or frame elements to which both ends or at least one end of the fibres is/are electrically connected. A woven fabric of continuous fibres may be optimal. The electrical connection between the carbon fibres and the conductive frame should be a minimum resistance join and in a preferred form each fibre end is surrounded with a molten metal which physically fixes and electrically connects the fibre end to the metal frame, during battery or cell construction. The metal frame or frame elements may themselves be formed by cooling molten metal strips along one or more edges of the electrode material to surround and embed the fibre ends. Optionally the fibres or fabric can continue beyond one or more frame elements at one or more edges to form another adjacent electrode or electrode section. Preferably substantially all or at least a majority of electrode fibres in one direction or in plane axis of the material are electrically connected to a metal frame element not more than 100 mm to 10 mm away from where the fibre starts in the active material or at both opposite edges of the material. This distance or the size or area of each current collector material section is mainly determined by the bulk resistivity of the current collector material in the most conducting direction. If only one edge of the fabric is electrically connected to a metal frame element, preferably this most conducting direction in the fabric is aligned perpendicular to the connected edge to minimize the overall resistance. To allow highest current density in an electrode without significant capacity loss, the length of the fabric from the connected edge may be up to about 50 to 100 mm. A metal frame may alternatively comprise a metal sheet with apertures, on one or both sides of the material, leaving the apertures or windows with solely carbon fibres carrying the current and collecting from the active material that they carry. For example an electrode frame of height 200 mm, may comprise three windows of height each 60 mm, with a conducting web left around the edge. For each of these window regions, carbon fabric can be spread and attached at the metal cross-bars and at the edges.

Typically during battery or cell construction the microscale current collector material is impregnated under pressure with a paste, which in a preferred form comprises a mixture of lead sulphate ($PbSO_4$) particles and dilute sulfuric acid. The lead sulphate particles may comprise milled or chemically formed particles which may have a mean size of 10 microns or less, and the size distribution may be optimised for charge generation or charge acceptance rather than forming a conductive network. In preferred embodiments lead sulphate paste is substantially the sole source of lead in the active material paste. Alternatively the paste may include some Pb and PbO. Alternatively again, in other embodiments the paste may comprise a mixture of Pb and PbO and dilute sulfuric acid. The paste may optionally also contain other additives such as carbon black, barium sulphate and sulphonate. It may also be optimised for electrolyte diffusion.

During initial cell formation (first charge and discharge cycle during which active particle linkages form) after cell or battery construction, in a conventional pasted-plate battery or cell where the paste comprises a mix of Pb oxides, cell formation occurs first by building the conducting framework, taking up most of the Pb in the negative active material, normally over lengths of several millimeters (connecting strings of perhaps a thousand or more micron sized particles end to end). This stage also produces small $PbSO_4$ particles. Second, these smaller particles attach to this conductive framework to provide and receive current. In accordance with this aspect of the invention the Pb framework is replaced with a microscale fibrous current collector and the paste comprises $PbSO_4$ particles, requiring during formation substantially only attaching these $PbSO_4$ particles to the nearest fibres in the microscale conductive current collector material. It may be advantageous that during formation the charging current is pulsed periodically. The fibre surfaces of the current collector material may be surface treated to enhance attachment of the $PbSO_4$ particles (at least the first particle in a chain) by processing to attach oxide particles or oxygen bearing chemical groups to the fibres. Anodic oxidation of electric arc-treated carbon fibre fabric also may convert it to a hydrophilic material. This may assist an even distribution of the active particles through the material and initial attraction of the Pb (covered with oxide groups) to the carbon, by dipole-dipole attractions.

A microscale electrode in accordance with the invention with an internal surface area may provide capacitance sufficient to add to charge acceptance over and above the electrochemical contribution. An electrode area that is well wetted by and accessible to the acid electrolyte may contribute an order of magnitude larger capacitance than that given by the total surface area of a conventional active material in the negative electrode of a lead-acid battery. It may have sufficient electrolytic double-layer capacity to absorb or deliver several seconds of high current. Alternatively a battery of the invention may comprise a separate high surface area electrode, which may comprise arc-treated carbon fibre material as described herein, in parallel to the or each negative or positive cell electrode, to add or increase capacitance.

Figure 2:
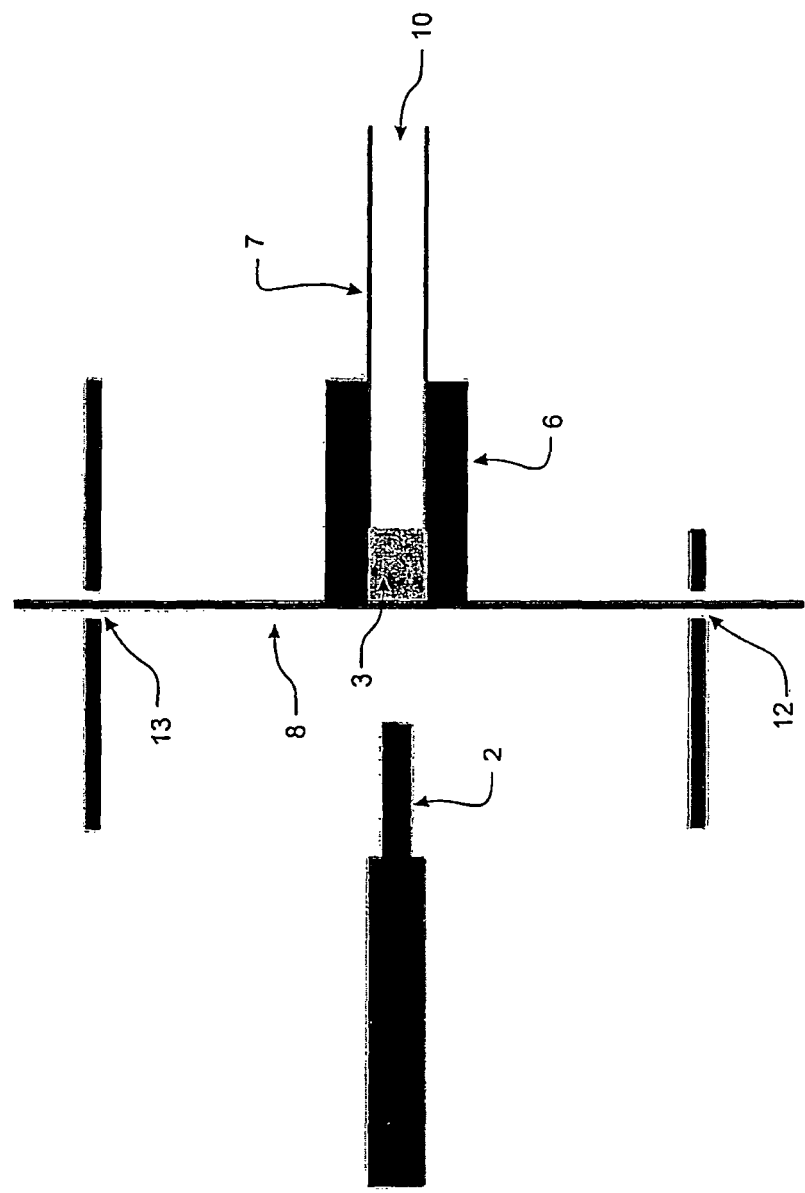
FIG. 2 is a close up schematic view of the electrodes and the material path between the electrodes of the reactor of FIG. 1.

In certain embodiments carbon fibre material may be treated by arc discharge by moving the carbon fibre material within a reaction chamber either through an electric arc in a gap between two electrodes or past an electrode so that an electric arc exists between the electrode and the material at a temperature effective to activate the material. In FIG. 1, reference numeral 1 indicates a reactor chamber in which the discharge arc is created. Electrodes 2 and 3 project into the reactor chamber 1 and are typically mounted by electrode-feeding mechanisms 4 as are known in the art, so that the position of electrode 3, which maybe the anode, and electrode 2, which may be the cathode (the positions of the anode and cathode may be reversed), may be adjusted to create the arc, and in operation to maintain or if required adjust the arc. A cooling system 5 consisting of copper tube coils wound around each electrodes through which water is circulated may also be arranged to cool the electrode(s). Carbon fibre material 8 passes between electrodes 2 and 3 and through the arc during operation of the reactor, as shown. This is shown in more detail in FIG. 2. The current should be sufficient to vaporise non-graphitic carbon but not trigger the destructive localised arc attachment mode Operation between 10 A and 20 A is recommended. The material may enter the reactor chamber through a slit 12 in the reactor chamber and leave through a similar exit slit 13 in the reactor chamber on the other side of the electrodes. A mechanism is provided to feed the material through the reactor chamber. For example during operation of the reactor the substrate may be unwound from a spool 9 driven by a gearbox which is coupled to an electric motor with an appropriate control system. During operation the interior of the reactor is preferably at or slightly above atmospheric pressure, and the gas flow exiting the reactor through slit 13 is extracted via a fume hood or similar. An inert gas such as nitrogen, argon or helium for example is flushed through the reaction chamber, for example by introducing a controlled gas flow inside the reaction chamber 1 through one of the openings 11 at the base of the reactor. Additionally or alternatively a gas flow may also be directed through the tungsten tube 7 via a porous carbon anode 3 to flush away carbon vapour and/or cool the substrate during arc treatment. The cooling flow through porous carbon 3 assists in avoiding burn-through of the material and removal of excessive carbon vapour during arc discharge, whereas the operation of the other inlet 11 serves to control oxidation. The anode as well as the spool which drives the tape are preferably earthed. Any take-up mechanism for collecting the substrate after it has passed through the reactor chamber is also preferably earthed, as is also the reactor shell. Referring to FIG. 2, it may be preferable for one electrode, which in the figure is the anode 3, to be positioned to impinge on the substrate 8 such that the substrate is tensioned against that electrode as the substrate moves past it as schematically shown. A gas flow 10 to cool the substrate may be directed through the carbon anode plug 3 housed inside a cylindrical carbon anode support 6 fixed on a tungten tube 7.

The method may be carried out in the presence of an introduced metal additive. Suitable additives may be Ni—Co, Co—Y, Ni—Y or alternatively lower cost additives such as Fe or B additive for example or a Pb additive.

EXPERIMENTAL

The invention is further illustrated by the following description of experimental work which is given by way of example and without intending to be limiting.

Example 1

Production of Arc Treated Carbon Fibre Electrode Material

Figure 3:
FIG. 3 is a photo micrograph of a section of the woven carbon fibre material referred to in subsequent experimental Example 1.
Figure 4:
FIG. 4 is a SEM image of a single multifibre filament of the carbon fibre material of FIG. 3, FIGS. 5 and 6 are "Ragone" type plots of specific capacity in Ah/kg Pb in the negative active mass versus specific current A/kg Pb in the negative active mass referred to in subsequent experimental Example 4.

A polyacrylonitrite (PAN) based woven carbon fibre tape CW1001 manufactured by TaiCarbon, Taiwan sold under the brand name KoTHmex of the specific weight 220 g/m$^2$, thickness was 0.7 mm, and a carbon content of 99.98% was cut into strips of width 25 mm. FIG. 3 is a photomicrograph of a section of the material. The material was woven from filaments, each comprising many carbon fibres of average diameter of 6-7 μm. FIG. 4 is a SEM image across a part of a single multifibre filament of the material.

The material strips were fed into a reactor through a slit 12 from a spool 9 similar to that described with reference to FIGS. 1 and 2, into the reaction chamber 1. The tape exited the reactor through an outlet slit 13. The graphite cathode diameter was 3 mm. The distance between the electrode tips was set to about 5-6 mm. During operation the reactor was flushed with nitrogen at a rate set to 10 L/min, and cooling water was circulated through cooling coils around the electrode supports. To strike the arc, the cathode was moved forward until the discharge took place, then the cathode was withdrawn slightly to establish the arc. The current was set to approximately 16 A. The material was fed through at a speed of 3 mm/s. An additional cooling gas was introduced through a porous carbon anode 3 to cool the material close to the arc attachment zone (as shown in FIG. 2). After the desired length of the carbon material had been run through the reactor the discharge was stopped by shutting off the power supply. Gas was flushed through the reactor for a further five minutes to remove exhaust gases.

Example 2

Effect of Arc Treatment on Resistivity of Carbon Fibre Electrode Material

Woven carbon fibre material as described in Example 1 was treated in an electric arc reactor also as described in Example 1 for 3 seconds. The measured treatment temperature in the arc was in the interval 3700-3800K. The resistivity of the fabric was measured by increasing the resistance of two different lengths of a 10 mm wide strip of the material using two spring-loaded clips with flat contacts 10 mm long, attached to the probes of a multi-meter set to resistance. By eliminating the contact resistances by difference the resistance per unit length could be calculated. By multiplying this by the thickness of the material and by the width of the strip the resistivity was obtained. The fabric before arc treatment had resistivities of 1.18 Ωm, and 0.135 Ωm respectively, for the untreated fabric and fibre. The arc treated fabric had a fabric resistivity of 0.1 Ωm, resulting in a fibre resistivity of 0.010 Ωm (the fabric resistivity is based on the total volume of the fabric, whereas the fibre resistivity is based on the volume of the carbon in the fabric).

Example 3

Effect of Arc Treatment on Capacitive Potential of Carbon Fibre Electrode Material Carbon fibre material as described in Example 1 and arc-treated also as in Example 1 was investigated for internal surface area and for effective electrolytic capacity.

Aromatic vapour adsorption: A benzene adsorbtion analysis with 5 ppm benzene vapour in atmospheric pressure nitrogen at room temperature, gave 3.5 μmole/g of the carbon fabric consistent with that adsorbed by an activated carbon of 100 m$^2$/g BET surface area. A comparative benzene adsorption analysis for the same carbon fabric without arc treatment gave 0.5 μmole benzene/g carbon fabric.

Nitrogen adsorption (BET): The material without arc treatment showed a BET surface area of around 220 m$^2$/g, but with almost unmeasureable pore volume and very fine pores (<1 nm). BET measurements of the arc-treated fabric gave values in the range 50 to 100 m$^2$/g carbon.

Effective electrolytic capacity: Cyclic voltammetry on two identical carbon fabric electrodes immersed in 1.28 s.g. sulphuric acid gave the effective capacitance per unit mass of the carbon fabric immersed stated below. Sweeping the individual potential of the negative electrode between −0.7 and −1.3 V with respect to a Hg/HgSO$_4$ reference electrode, the charging and then discharging current was integrated around the cycle, and divided by 2× total voltage sweep range of the cell to obtain the electrode capacitance. This was done for sweep voltage rates between 0.5 mV/s to 1000 mV/s. For sweep voltage rates equal to or larger than 10 mV/s, the charge over discharge ratio was 1.13. Then to obtain the specific electrode capacitance, the electrode capacitance was divided by the average mass of the carbon per electrode. The resulting electrode capacitance values are listed below:

| Sample | 10 mV/s | 100 mV/s | 1000 mV/s |
| --- | --- | --- | --- |
| Without arc treatment | 25.2 | 3.9 | 0.5 |
| Arc treated | 37 | 7.3 | 1.2 |
| Time per cycle in seconds | 60 | 6 | 0.6 |

The arc-treated fabric had larger capacitance. Also the ratio of the arc-treated to non-treated increases as the sweep rate increases, reflecting the larger pore size found in the BET measurements.

Example 4

Battery with Negative Electrode Current Collectors of Arc-Treated Carbon Arc Treated Fibre Material A small 3 cell 6V lead acid motorcycle battery of 2 Ah capacity (Bike Master 6N2 2A1) at the beginning of its life was disassembled by first cutting off the polypropylene top. Each cell was made up of one positive electrode between two negative electrodes. The positive electrode had active material loaded in its grid with access to electrolyte either side. Each negative electrode was likewise constructed and was separated from the positive by a fibrous separator. The size of each original electrode was 56 mm wide and 44 mm high giving an area of 26.4 $cm^2$. With two active surfaces acting in parallel, the total negative-positive area for each cell was (2)(26.4)=52.8 $cm^2$. The thickness of each original active layer was around 2 mm.

One of the negative electrodes of one cell was removed and replaced by a smaller negative electrode made up as described below. The other negative electrode was disconnected from the charging circuit.

The smaller negative electrode was made up of four layers each 10 mm×45 mm×0.5 mm thick of a woven carbon fabric as described in Example 1 arc treated also as described in Example 1 (resulting in properties 150 $g/m^2$, 0.5 mm thick, 0.23 Ω/sq along roll, 0.37 Ω/sq across roll). The layers were cut from a roll of the carbon fabric with the long side in the direction of the width of the unwound roll. Of these layers, 35 mm length was used as an active area and 10 mm used as an electrical contact area. Prior to arc treatment the material was fully wetted with $Pb(NO_3)_2$ aqueous solution, dried overnight so that 2 mass % Pb was deposited. The arc treatment graphitised the material and distributed the lead in a smooth coating over all fibres. SEM micrographs showed a uniform layer of around 100 nm thick on the fibres, shown by microprobe elemental analysis to be $PbO_2$.

Four such layers were then assembled one beneath the other so that they were all bonded to lead shim to form a connecting lug at one of their ends. A 0.8 mm dia lead solder wire (60% Sn, 40% Pb) that incorporated a resin flux core was laid in zig-zag form in the three gaps between the four layers. A 20 mm wide ribbon of metallic lead (0.6 mm thick) was then wrapped around the outside of the ends of the four layers, covering the top 10 mm section of each layer. The lead coverings were squeezed between the two electrodes of a spot-welder while current was passed to melt the ensemble, providing good contact between the carbon fibres and solder and lead. In this way, a lug was formed on the top end of the electrode, connecting and holding the carbon fabric layers that could be flexibly moved about for further treatment.

To make the active material, $PbSO_4$ powder (mean size 4-5 μm after milling) was mixed in with low concentration sulphuric acid (s.g. <1.05) to make a paste of 78 mass % $PbSO_4$ (0.37 volume fraction). This paste was squeezed with a spatula into the free exposed part (35 mm length) of each layer of carbon fabric, while that layer was pressed against the flat bottom of a glass vessel immersed in an ultrasound cleaning bath (180 W, 4 L, 53 kHz). Each pasted layer was then scraped clean of superfluous paste. These pasted layers were also lightly squeezed together at this point to make good contact with each other while still wet.

The whole electrode had a superficial active area of 3.5 $cm^2$ (where the $PbSO_4$ had been loaded) and was 2 mm thick. This electrode was dried to allow the dry mass of $PbSO_4$ to be measured, and then inserted in place of a larger negative of the original battery, and the cell then became limited only by the new 3.5 $cm^2$ electrode, opposite a single 26.4 $cm^2$ conventional positive.

Figure 5:
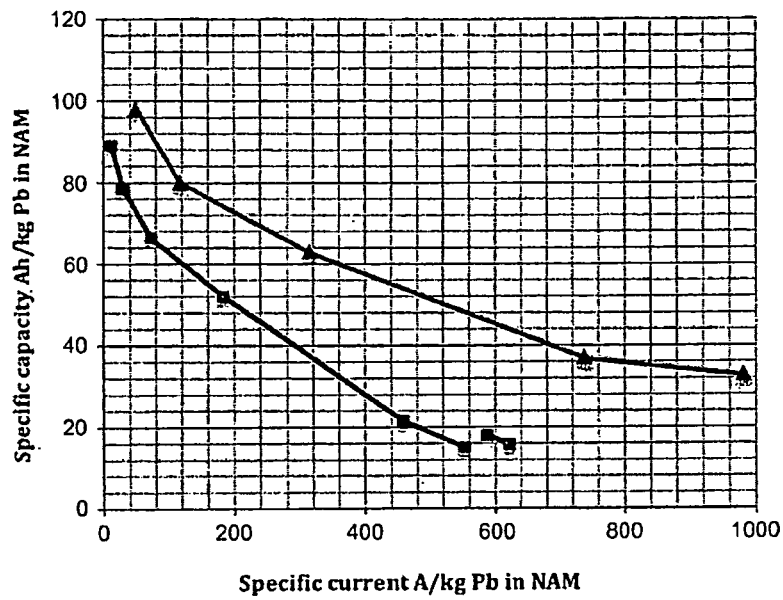

After insertion of the negative electrode into the cell, charging was immediately started using a Cadex C7200-C battery analyser (Cadex Electronics, British Columbia, Canada) using a period of controlled 45 mA current followed by a period of controlled cell voltage at 2.4 V. After the formation charge and discharge, a further 4 complete cycles with 45 mA initial charging current and 17 mA discharge current were carried out to stabilize the electrode capacity. Further cycles were charged at 45 mA (around 39 A/kg Pb in the negative active mass) and discharged at successively higher currents of 40, 195, 256, 655, 800 mA and then stepped down over the same values. The current during discharge was integrated with the respect to time to estimate the capacity for each cycle in mAh. These capacities and currents were divided by the mass of lead in the electrode (estimated from the dry mass of $PbSO4$). FIG. 5 is a "Ragone" type plot of the return sequence points specific current A/kg Pb in the negative active mass (NAM) versus specific capacity Al/kg Pb in the NAM—triangle data points.

Figure 6:
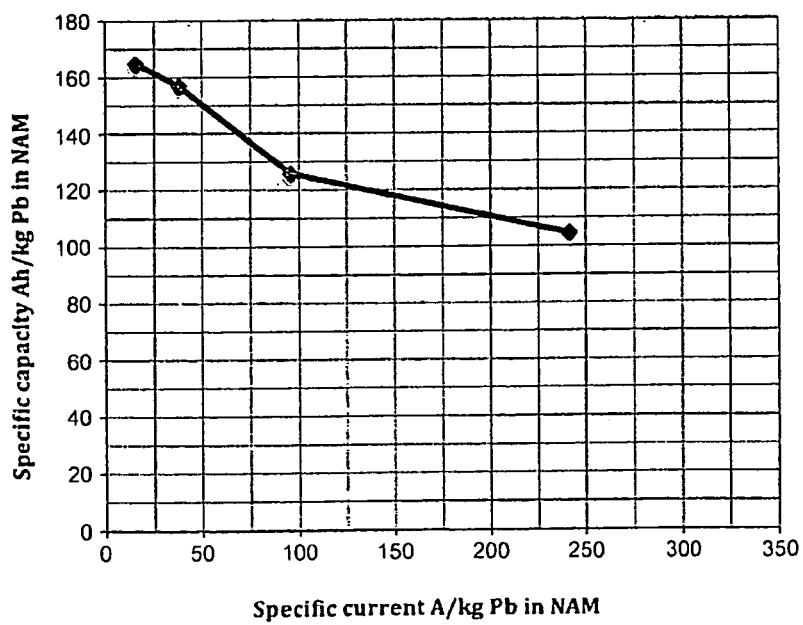

FIG. 6 is a plot similar to FIG. 5 for a battery made up as described above but with three carbon fibre layers in the carbon fibre negative electrode instead of four layers and with all of the cut edge of two of three the layers completely surrounded by solder at the connecting lug. The higher capacity may be due to lower resistance at this connection.

Example 5

Battery with Negative Electrode Current Collector of Non-Arc Treated Carbon Fibre Material A battery was constructed as described in Example 4 but without first arc treating the carbon fibre material. Capacities were measured as described in Example 4. These capacity—current measurements were again divided by the lead mass in the active material of the negative, and were plotted in FIG. 5—square data points.

The battery of Example 4 with arc treated fabric electrodes had superior capacity performance particularly at high current densities.

Example 6

Figure 7:
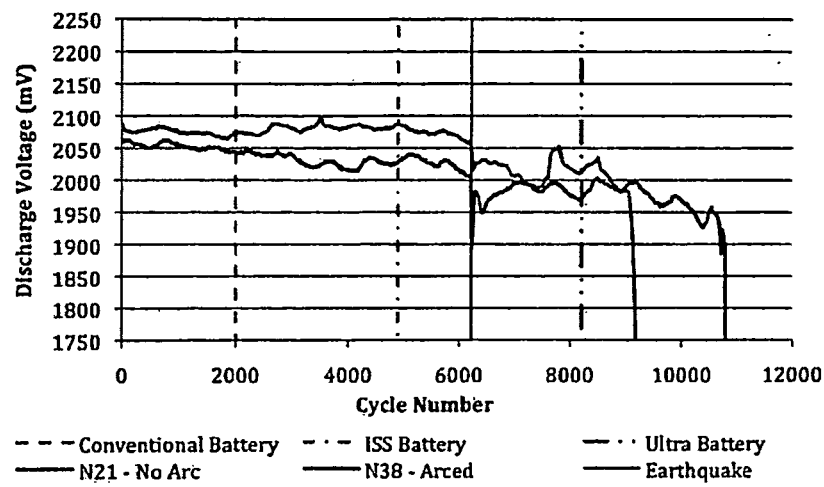
FIG. 7 is a cycle end-of-discharge cell voltage plot referred to in subsequent experimental Examples 6 and 7.

Negative Electrode Current Collector of Arc-Treated Carbon Fibre Material—Cycle Life An electrode was constructed with arc-treated PAN-based carbon fibre fabric as described in Example 4 with no additives in the paste, and subjected to an accelerated lifetime test which approximated the partial state of charge (PSOC) duty in mild hybrid vehicles, beginning with a fully charged battery, then discharging at 50 A for 1 minute, then charging for 1 minute, and continuing until the cell voltage at the end of the discharge time drops below around 1.75 V per cell. The charge began at a constant 50 A, until the cell voltage rose to 2.35 V, dropping after this to maintain the charging voltage constant. The Cadex C7200-C battery tester was also used for this test. The end-of-discharge cell voltage is plotted in FIG. 7 against cycle number—darker plot, and it can be seen that almost 11,000 cycles were achieved before failure. The sudden drop just after 6000 cycles was due to an earthquake turning off power for 10 days. Typical lifetimes are also indicated for typical conventional lead-acid battery, an ISS battery, and an "Ultrabattery".

Example 7

Negative Electrode Current Collector of Non-Arc Treated Carbon Fibre Material—Cycle Life An electrode was constructed from non-arc treated carbon fibre as described in Example 6 and was subjected to the same accelerated lifetime test as described in Example 6, but with more active material. The end-of-discharge cell voltage is plotted on FIG. 7 against cycle number—lighter plot, showing a lifetime of just more than 9000 cycles.

The arc-treated fabric electrode of Example 6 had a higher lifetime (despite having higher current density).

Example 8

Figure 8:
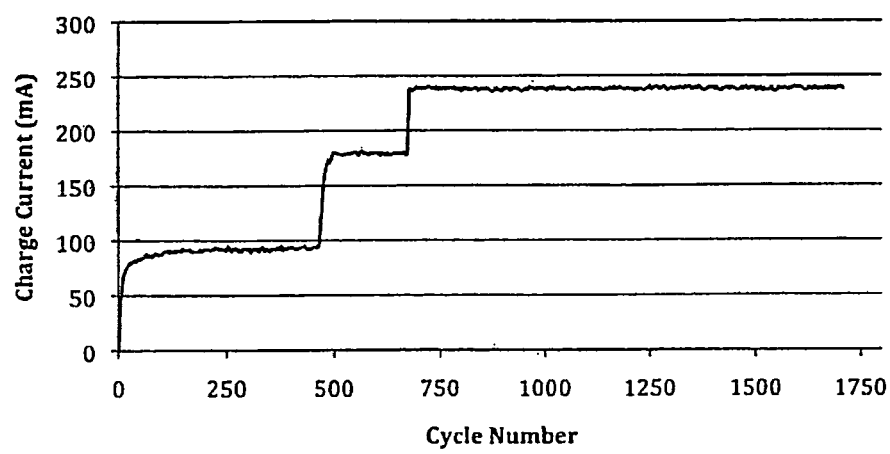
FIG. 8 is a plot of charge current against number of cycles referred to in experimental Example 8.

Negative Electrode Current Collector of Arc-Treated Carbon Fibre Material—Charge Acceptance The battery of Example 4 was tested for charge acceptance over a range of currents prior to the tests of Example 4. The charging tests followed the cycle of charge and discharge described in Example 7, but the currents were reduced below and raised above the 167 mA chosen for that test. The battery was near fully charged. The charge and discharge periods used were again 1 minute. The Cadex C7200-C was again used. The timing of the one measurement of charge current varied according to the current. The charge current set at the beginning of the test was 120 mA for the first 450 cycles, 180 mA for the second set of 200 cycles and 240 mA for the last set of 1000 cycles. It took some seconds for the current to rise to the set level, as observed from the digital current meter. The measured current is plotted in FIG. 8 against total number of cycles. The current was measured at almost 60 s after the start of charging for the 120 mA cycles (measured at 90 mA), 19 s after the start for the 180 mA cycles (at 180 mA) and 23 s after the start for the 240 mA (at 238 mA). Thus the charging current dropped from 120 to 90 mA over the full minute, and dropped negligibly from 180 mA over 19 s, and dropped just 2 mA over 23 from 240 mA.

The maximum specific charging rate tested for was (240 mA)/(0.81 g)=295 A/kg of lead in the active mass, and the electrode can accept this at least for around 20 s (enough for regenerative charging in a hybrid vehicle). Probably the charging current continued high for the full minute even for the highest current. As the test progressed the state of charge will have decreased somewhat, allowing more charge to be accepted.

The foregoing describes the invention including preferred forms thereof and alterations and modifications as will be obvious to one skilled in the art are intended to be incorporated in the scope thereof as defined in the accompanying claims.

The invention claimed is:

1. A lead-acid battery or cell including at least one electrode comprising:
   (a) as a current collector a woven or knitted or non-woven conductive fibrous material comprising:
   multifiber filaments composed of fibers with an average interfiber spacing between fibers within each multifiber filament of less than 50 microns,
   filaments which are monofibers, and in which the average interfiber spacing between the monofibers throughout the conductive fibrous material is less than 50 microns, or both,
   (b) conducting chains of Pb-based particles attached to the fibers in the interfiber spacing throughout at least some of the multifiber filaments, or in the interfiber spacing between monofibers, and
   (c) dilute sulphuric acid in the interfiber spacing and in contact with the fibers or monofibers and the Pb-based particles.

2. A lead-acid battery or cell according to claim 1 wherein the conducting chains of Pb-based particles have been formed by impregnating a paste comprising Pb-based particles into the conductive fibrous material and passing a formation current through the battery or cell.

3. A lead-acid battery according to claim 1 wherein the conducting chains of Pb-based particles have been formed by impregnating a paste comprising lead sulphate particles into the conductive fibrous material and passing a formation current through the battery or cell.

4. A lead-acid battery or cell according to claim 1 wherein the conducting chains of Pb-based particles have been formed by impregnating a paste comprising Pb and PbO particles into the conductive fibrous material and passing a formation current through the battery or cell.

5. A lead-acid battery or cell according to claim 1 wherein the conducting chains of Pb-based particles have been formed by impregnating a paste comprising lead salt particles into the conductive fibrous material and passing a formation current through the battery or cell.

6. A lead-acid battery or cell according to claim 2 wherein the paste also comprises dilute sulphuric acid.

7. A lead-acid battery or cell according to claim 6 wherein an electrolyte of the battery or cell comprises dilute sulphuric acid.

8. A lead-acid battery or cell according to claim 2 wherein at least a major fraction of the Pb-based particles in the paste have a mean size of 10 microns or less.

9. A lead-acid battery or cell according to claim 1 in which the average depth of the conductive fibrous material is at least 0.2 millimeters.

10. A lead-acid battery or cell according to claim 1 wherein at least a major fraction of the fibers or monofibers have a mean fiber diameter of about 6 to about 7 microns.

11. A lead-acid battery or cell according to claim 1 wherein the conductive fibrous material comprises a carbon fiber material.

12. A lead-acid battery or cell according to claim 11 wherein the carbon fiber material has been thermally treated.

13. A lead-acid battery according to claim 11 wherein the carbon fiber material has been thermally treated by electric arc discharge.

14. A lead-acid battery or cell according to claim 13 wherein the carbon fiber material has been thermally treated by electric arc discharge by causing relative movement between the carbon fibre material and an electric arc in a gap between two arc electrodes or past an arc electrode so that an electric arc exists between the arc electrode and the carbon fiber material.

15. A lead-acid battery or cell according to claim 13 wherein the carbon fiber material has been thermally treated by electric arc discharge in the presence of an introduced metal additive.

16. A lead-acid battery or cell according to claim 1 wherein the conductive fibrous material has bulk resistivity less than 10 Ωmm.

17. A lead-acid battery or cell according to claim 1 wherein the conductive fibrous material has a thermal conductivity of not less than 25 W m$^{-1}$K$^{-1}$.

18. A lead-acid battery or cell according to claim 1 wherein the conductive fibrous material has been surface activated to increase its easily accessible surface area to increase capacitance.

19. A lead-acid battery or cell according to claim 1 wherein said at least one electrode comprises a conductive frame or frame elements supporting the conductive fibrous material and to which the filaments of the conductive fibrous material are electrically connected.

20. A lead-acid battery or cell according to claim 19 wherein the filaments of the conductive fibrous material are electrically connected to the metal frame or frame elements by a metal element in which ends or another portion of the filaments are embedded and which was molten on application to the filaments at manufacture.

21. A lead-acid battery or cell according to claim 1 wherein the conductive fibrous material is supported, and the filaments of the conductive fibrous material are electrically connected, by a metal element in which ends or another portion of the filaments are embedded and which was molten on application to the filaments at manufacture.

22. A method for manufacturing a lead-acid battery or cell which includes forming at least one electrode by:
 providing as a current collector a woven or knitted or non-woven conductive fibrous material comprising:
 multifiber filaments composed of fibers, with an average interfiber spacing between fibers within each multifiber filament of less than 50 microns,
 filaments which are monofibers and in which the average interfiber spacing between the monofibers is less than 50 microns throughout the conductive fibrous material, and then
 forming conductive chains of Pb-based particles attached to the fibers in the interfiber spacing throughout at least some of the multifiber filaments, or in the interfiber spacing between monofibers, with dilute sulphuric acid in the interfiber spacing and in contact with the fibers or monofibers and the Pb-based particles.

23. A method according to claim 22 wherein the fibrous material comprises a carbon fiber material.

24. A method according to claim 23 including thermally treating the carbon fiber material by electric arc discharge.

25. A lead-acid battery or cell including at least one electrode comprising:
 a woven or knitted or non-woven fibrous material, the fibrous material comprising multiple filaments, the multiple filaments comprising multifiber filaments comprising fibers, with an average interfiber spacing between fibers within multifiber filaments of less than 50 microns,
 conducting chains of Pb-based particles attached to fibers in said interfiber spacing, throughout at least some of the multifiber filaments, and
 dilute sulphuric acid in said interfiber spacing in contact with the fibers and with the Pb-based particles in said interfiber spacing.

* * * * *